United States Patent
Zhang et al.

(10) Patent No.: US 11,847,471 B2
(45) Date of Patent: *Dec. 19, 2023

(54) FAST BOOT SYSTEMS AND METHODS FOR PROGRAMMABLE LOGIC DEVICES

(71) Applicant: Lattice Semiconductor Corporation, Portland, OR (US)

(72) Inventors: Fulong Zhang, Cupertino, CA (US); Gordon Hands, San Jose, CA (US); Satwant Singh, Fremont, CA (US); Wei Han, Portland, OR (US); Ravindar Lall, Portland, OR (US); Joel Coplen, Portland, OR (US); Sreepada Hegade, San Jose, CA (US); Ming Hui Ding, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/485,104

(22) Filed: Sep. 24, 2021

(65) Prior Publication Data
US 2022/0012064 A1  Jan. 13, 2022

Related U.S. Application Data

(63) Continuation of application No. 16/228,647, filed on Dec. 20, 2018, now Pat. No. 11,132,207.
(Continued)

(51) Int. Cl.
*G06F 9/44* (2018.01)
*H03K 19/17* (2006.01)
(Continued)

(52) U.S. Cl.
CPC .......... *G06F 9/4418* (2013.01); *G06F 3/0611* (2013.01); *G06F 3/0632* (2013.01);
(Continued)

(58) Field of Classification Search
CPC .... G06F 9/4418; G06F 3/0611; G06F 3/0632; G06F 3/0673; G06F 9/44505;
(Continued)

(56) References Cited

U.S. PATENT DOCUMENTS 6,147,509 A   11/2000  Oku
7,017,038 B1   3/2006  LaChance et al.
(Continued)

FOREIGN PATENT DOCUMENTS

EP   2523349   11/2012

OTHER PUBLICATIONS

Meyer et al., "Embedded Systems Start-up under Timing Constraints on Modern FPGAs", 21$^{st}$ International Conference on Field Programmable Logic and Applications, 2011, 7 pages, IEEE.
(Continued)

*Primary Examiner* — Michael J Brown
(74) *Attorney, Agent, or Firm* — Haynes and Boone, LLP

(57) ABSTRACT

Various techniques are provided to implement fast boot for programmable logic devices (PLDs). In one example, a method includes receiving configuration data associated with a PLD. The PLD includes an array of configuration memory cells including logic block memory cells and input/output (I/O) block memory cells associated with the PLD's logic fabric and I/O fabric, respectively. The method further includes programming a subset of the I/O block memory cells with the configuration data, and providing a wakeup signal to activate functionality associated with a portion of the I/O fabric. The method further includes programming remaining configuration memory cells of the array with the configuration data, where the remaining configuration memory cells include at least a subset of the logic block memory cells. The method further includes providing a wakeup signal to activate functionality associated with at
(Continued)

least a portion of the logic fabric. Related systems and devices are provided.

20 Claims, 11 Drawing Sheets

Related U.S. Application Data

(60) Provisional application No. 62/612,265, filed on Dec. 29, 2017.

(51) Int. Cl.
| | | |
|---|---|---|
| *G06F 3/06* | (2006.01) | |
| *G06F 9/4401* | (2018.01) | |
| *H03K 19/17756* | (2020.01) | |
| *H03K 19/17758* | (2020.01) | |
| *G06F 9/445* | (2018.01) | |
| *G06F 21/57* | (2013.01) | |

(52) U.S. Cl.
CPC ........ *G06F 3/0673* (2013.01); *G06F 9/44505* (2013.01); *G06F 21/575* (2013.01); *H03K 19/17756* (2013.01); *H03K 19/17758* (2020.01); *G06F 2221/033* (2013.01)

(58) Field of Classification Search
CPC ............ G06F 21/575; G06F 2221/033; H03K 19/17756; H03K 19/17758
USPC .................................................. 713/1, 2, 100
See application file for complete search history.

(56) References Cited

U.S. PATENT DOCUMENTS

| | | | |
|---|---|---|---|
| 7,518,396 | B1 | 4/2009 | Kondapalli et al. |
| 7,521,961 | B1 | 4/2009 | Anderson |
| 8,786,310 | B1 | 7/2014 | Lu et al. |
| 9,590,635 | B1 | 3/2017 | Sengupta |
| 11,132,207 | B2 * | 9/2021 | Zhang ................... G06F 3/0611 |
| 2010/0156458 | A1 | 6/2010 | Speers |
| 2014/0282819 | A1 | 9/2014 | Sastry et al. |
| 2015/0199520 | A1 | 7/2015 | Woolley et al. |
| 2016/0118988 | A1 | 4/2016 | Sood et al. |

OTHER PUBLICATIONS

Wang et al., "An FPGA Configuration Circuit Used for Fast and Partial Configuration", School of Microelectronics, Fudan University, 2007, 4 pages, IEEE.

* cited by examiner

FAST BOOT SYSTEMS AND METHODS FOR PROGRAMMABLE LOGIC DEVICES

CROSS-REFERENCE TO RELATED APPLICATION

This application is a continuation of U.S. patent application Ser. No. 16/228,647 filed Dec. 20, 2018 and entitled "FAST BOOT SYSTEMS AND METHODS FOR PROGRAMMABLE LOGIC DEVICES," which in turn claims priority to and the benefit of U.S. Provisional Patent Application 62/612,265 filed Dec. 29, 2017 and entitled "FAST BOOT SYSTEMS AND METHODS FOR PROGRAMMABLE LOGIC DEVICES," all of which are hereby incorporated by reference in their entirety.

TECHNICAL FIELD

The present invention relates generally to programmable logic devices and, more particularly, to fast boot techniques for such devices.

BACKGROUND

Programmable logic devices (PLDs) (e.g., field programmable gate arrays (FPGAs), complex programmable logic devices (CPLDs), field programmable systems on a chip (FPSCs), or other types of programmable devices) may be configured with various user designs to implement desired functionality. Typically, the user designs are synthesized and mapped into configurable resources, including by way of non-limiting example programmable logic gates, look-up tables (LUTs), embedded hardware, interconnections, and/or other types of resources, available in particular PLDs. Physical placement and routing for the synthesized and mapped user designs may then be determined to generate configuration data for the particular PLDs. The generated configuration data is loaded into configuration memory of the PLDs to implement the programmable logic gates, LUTs, embedded hardware, interconnections, and/or other types of configurable resources. The loading of the configuration data may take a considerable amount of time. Therefore, improved techniques for the loading of configuration data and PLD operation are desired.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
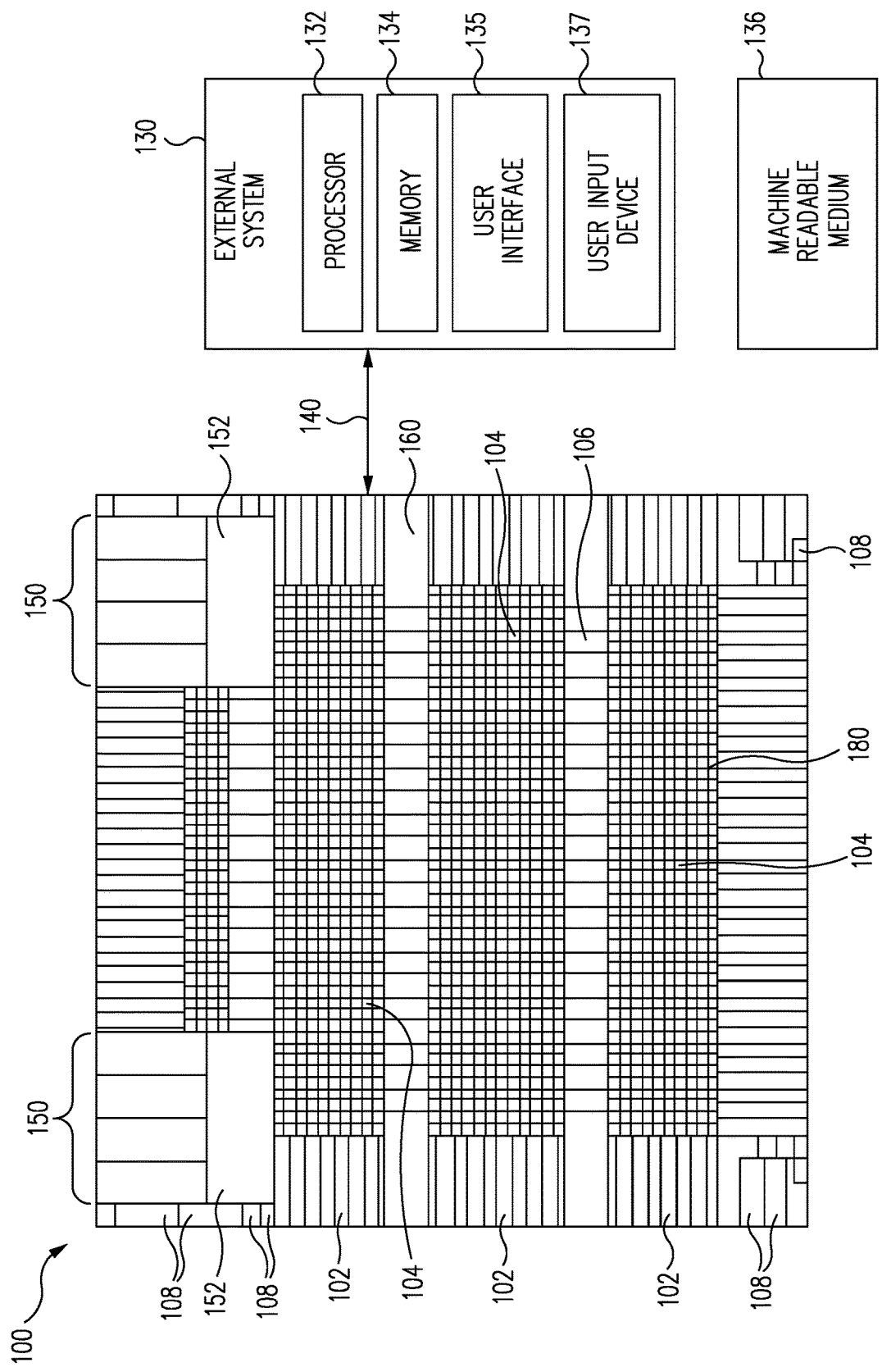
FIG. 1 illustrates a block diagram of a PLD in accordance with an embodiment of the disclosure.

Various techniques are provided to facilitate fast boot for PLDs. In some embodiments, a PLD may be implemented with fast boot capability to allow at least a portion of an input/output (I/O) fabric of the PLD to provide I/O functionality. Fast boot may also be referred to as fast wake up, fast activation, early boot, early wake up, early activation, or variant thereof. In some cases, alternatively or in addition, a portion of a logic fabric and/or other components of the PLD may be designated for fast boot. To this end, some functionality (e.g., I/O and/or logic functionality) of the PLD may be designated for fast boot.

In an embodiment, to facilitate fast boot, configuration data associated with a portion of the I/O fabric designated for fast boot may be loaded into configuration memory cells associated with the portion of the I/O fabric. Once the configuration memory cells have been configured (e.g., programmed, loaded with configuration data), a wakeup signal may be provided to wake up (e.g., also referred to as activate) I/O functionality associated with the portion of the I/O fabric. In waking up the I/O functionality, the I/O functionality transitions from a configuration mode to a fast boot operation mode.

After the portion of the I/O fabric has been activated, remaining configuration memory cells of the PLD, which may include the logic fabric and any remaining portion of the I/O fabric, may be configured with corresponding configuration data and activated. Once all of the configuration data is loaded into the PLD, the PLD can wake up and provide functionality. In waking up the remaining functionality of the PLD, the functionality transitions to a full system operation mode (e.g., also referred to as normal operation mode). In an aspect, the I/O functionality designated for fast boot may transition from the fast boot operation mode to the full system operation mode, whereas the remaining functionality (e.g., functionality not designated for fast boot) may transition from the configuration mode to the full system operation mode. Alternatively or in addition to designating at least some I/O functionality for fast boot, logic functionality and/or other components of the PLD may be designated for fast boot.

The configuration data may be provided as a configuration bitstream. Configuration time for configuring (e.g., loading configuration data into) a PLD may be based on a configuration method, bitstream source, link speed of a bitstream (e.g., including the configuration bitstream) to be written into the PLD, and/or other factors. Prior to configuring the PLD using the configuration bitstream, the I/O fabric and logic fabric of the PLD may be in an unknown state or tri-stated state (e.g., aside from any hardcoded components of the PLD which are generally in a defined state at power on).

In providing fast boot of the I/O functionality, the PLD may provide predictable I/O behavior (e.g., I/O functionality) soon after powering up a device, without waiting for the entire PLD to be configured and activated prior to providing such I/O behavior. Such a device may include the PLD and/or may be controlled by the PLD. An example of a device may be a fan or a light emitting diode (LED). In this regard, the I/O functionality that is activated may drive proper polarity (e.g., on or off, 1 or 0) with desired driver characteristics (e.g., I/O type, drive strength, pull up/down feature, etc.) to devices controlled by the PLD.

In some user-specified applications, a delay associated with providing the I/O behavior may adversely affect user and/or consumer experience and/or otherwise be undesirable. For example, LEDs controlled by the PLD may have undefined behavior (e.g., due to the undefined I/O functionality), which may be experienced as flickering or generally any misbehavior of the LEDs prior to the functionality being activated (e.g., placed in a defined state). By providing fast boot to allow early wake up of the I/O behavior of the PLD associated with the LEDs, the LEDs may receive appropriate control signals to define behavior of the LEDs. In these user-specified applications, other functionality of the PLD may be considered to be less critical, less time-sensitive, and/or less apparent and thus may be activated at a later time. As an example, in a case that the entire PLD is configured and activated in tens or hundreds of milliseconds, the portions of the PLD designated for fast boot may be configured and activated in the microseconds range (e.g., 1 µs-1,000 µs). Time associated with configuration and activation for fast boot operation may be based at least in part on the amount of I/O and/or logic functionality designated for fast boot.

In some aspects, such I/O functionality provided by the PLD may be referred to as static state control, and fast boot of such I/O functionality may be referred to as fast boot static state control. Static state control may provide control to component coupled to the PLD that is generally independent of the PLD's logic fabric. In some cases, fast boot may be applied to a portion of the logic fabric of the PLD that controls I/O functionality. In these cases, the fast boot may facilitate static state control (e.g., I/O fabric-based control independent of logic fabric) and/or logic fabric controlled I/O.

In an embodiment, security may be enabled for at least a portion of the configuration data. To enable security, one or more authentication certificates may be generated. In some cases, one or more authentication certificates may be provided for configuration data associated with fabric (e.g., I/O and/or logic functionality) designated for fast boot, and/or one or more authentication certificates may be provided for configuration data not designated for fast boot. Authentication may be performed based on the authentication certificate(s) before or after corresponding configuration data has been loaded into the PLD. For example, when a portion of the I/O fabric is designated for fast boot, a portion of the configuration data may be loaded into configuration memory cells associated with the portion of the I/O fabric. An authentication may be performed based on an authentication certificate(s) associated with the portion of the configuration data. If the authentication is successful, functionality associated with the portion of the I/O fabric can be activated and remaining configuration data loaded into the PLD. If the authentication is not successful, the configuration and activation of the PLD may be aborted.

Using various embodiments, portions of I/O and/or logic functionality of the PLD may be configured and activated to provide a stable, controlled state, prior to configuring and activating other functionality. In some cases, at least some I/O functionality may be designated for fast boot to effectuate a low I/O wakeup time of the PLD with respect to such I/O functionality. In some aspects, once the remainder of the PLD is configured and activated, seamless (e.g., glitchless) transition from a fast boot operation mode to a full system operation mode may be provided.

Referring now to the figures, FIG. 1 illustrates a block diagram of a PLD 100 in accordance with an embodiment of the disclosure. The PLD 100 (e.g., an FPGA, a CPLD, an FPSC, or other type of programmable device) generally includes I/O blocks 102 and programmable logic blocks (PLBs) 104. In some cases, the PLD 100 may generally be any type of programmable device (e.g., programmable integrated circuit) with distributed configuration, which may involve loading configuration data through pins, shifting to appropriate locations in associated fabric, and configuring configuration memory cells. The PLBs may also be referred to as logic blocks, programmable functional units (PFUs), or programmable logic cells (PLCs). In an aspect, the PLBs 104 may collectively form an integrated circuit (IC) core or logic core of the PLD 100. The I/O blocks 102 provide I/O functionality (e.g., to support one or more I/O and/or memory interface standards) for the PLD 100, while the PLBs 104 provide logic functionality (e.g., LUT-based logic) for the PLD 100. Additional I/O functionality may be provided by serializer/deserializer (SERDES) blocks 150 and physical coding sublayer (PCS) blocks 152. The PLD 100 may also include hard intellectual property core (IP) blocks 160 to provide additional functionality (e.g., substantially predetermined functionality provided in hardware which may be configured with less programming than the PLBs 104).

The PLD 100 may include blocks of memory 106 (e.g., blocks of erasable programmable read-only memory (EEPROM), block static RAM (SRAM), and/or flash memory), clock-related circuitry 108 (e.g., clock sources, phase-locked loop (PLL) circuits, and/or delay-locked loop (DLL) circuits), and/or various routing resources 180 (e.g., interconnect and appropriate switching circuits to provide paths for routing signals throughout the PLD 100, such as for clock signals, data signals, control signals, wakeup signals, or others) as appropriate. The PLD 100 may include configuration and activation logic to receive configuration data, configure various programmable elements of the PLD 100, and activate functionality associated with these programmable elements. In general, the various elements of the PLD 100 may be used to perform their intended functions for desired applications, as would be understood by one skilled in the art.

For example, certain of the I/O blocks 102 may be used for programming the memory 106 or transferring information (e.g., various types of user data and/or control signals) to/from the PLD 100. Other of the I/O blocks 102 include a first programming port (which may represent a central processing unit (CPU) port, a peripheral data port, a serial peripheral interface (SPI) interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, the I/O blocks 102 may be included to receive configuration data and commands (e.g., over one or more connections) to configure the PLD 100 for its intended use and to support serial or parallel device configuration and information transfer with the SERDES blocks 150, PCS blocks 152, hard IP blocks 160, and/or PLBs 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout the PLD 100, such as in and between the PLBs 104, hard IP blocks 160, and routing resources 180 to perform their conventional functions (e.g., storing configuration data that configures the PLD 100 or providing interconnect structure within the PLD 100). For example, the routing resources 180 may be used for internal connections within each PLB 104 and/or between different PLBs 104. It should also be understood that the various embodiments disclosed herein are not limited to programmable logic devices, such as the PLD 100, and may be applied to various other types of programmable devices, as would be understood by one skilled in the art.

An external system 130 may be used to create a desired user configuration or design of the PLD 100 and generate corresponding configuration data to program (e.g., configure) the PLD 100. For example, to configure the PLD 100, the system 130 may provide such configuration data to one or more of the I/O blocks 102, PLBs 104, SERDES blocks 150, and/or other portions of the PLD 100. In this regard, the external system 130 may include a link 140 that connects to a programming port (e.g., SPI, JTAG) of the PLD 100 to facilitate transfer of the configuration data from the external system 130 to the PLD 100. As a result, the I/O blocks 102, PLBs 104, various of the routing resources 180, and any other appropriate components of the PLD 100 may be configured to operate in accordance with user-specified applications. In some cases, the I/O blocks 102 or portion thereof may be designated for fast boot. In some cases, the PLBs 104 or portion thereof may be designated for fast boot.

In the illustrated embodiment, the system 130 is implemented as a computer system. In this regard, the system 130 includes, for example, one or more processors 132 that may be configured to execute instructions, such as software instructions, provided in one or more memories 134 and/or stored in non-transitory form in one or more non-transitory machine readable media 136 (e.g., which may be internal or external to the system 130). For example, in some embodiments, the system 130 may run PLD configuration software, such as Lattice Diamond System Planner software available from Lattice Semiconductor Corporation to permit a user to create a desired configuration and generate corresponding configuration data to program the PLD 100.

In some embodiments, the memory 106 of the PLD 100 may include non-volatile memory (e.g., flash memory) utilized to store the configuration data generated and provided to the memory 106 by the external system 130. During configuration of the PLD 100, the non-volatile memory may provide the configuration data via configuration paths and associated data lines to configure the various portions (e.g., I/O blocks 102, PLBs 104, SERDES blocks 150, routing resources 180, and/or other portions) of the PLD 100. In some cases, the configuration data may be stored in non-volatile memory external to the PLD 100 (e.g., on an external hard drive such as the memories 134 in the system 130). During configuration, the configuration data may be provided (e.g., loaded) from the external non-volatile memory into the PLD 100 to configure the PLD 100.

The system 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of the PLD 100.

Figure 2:
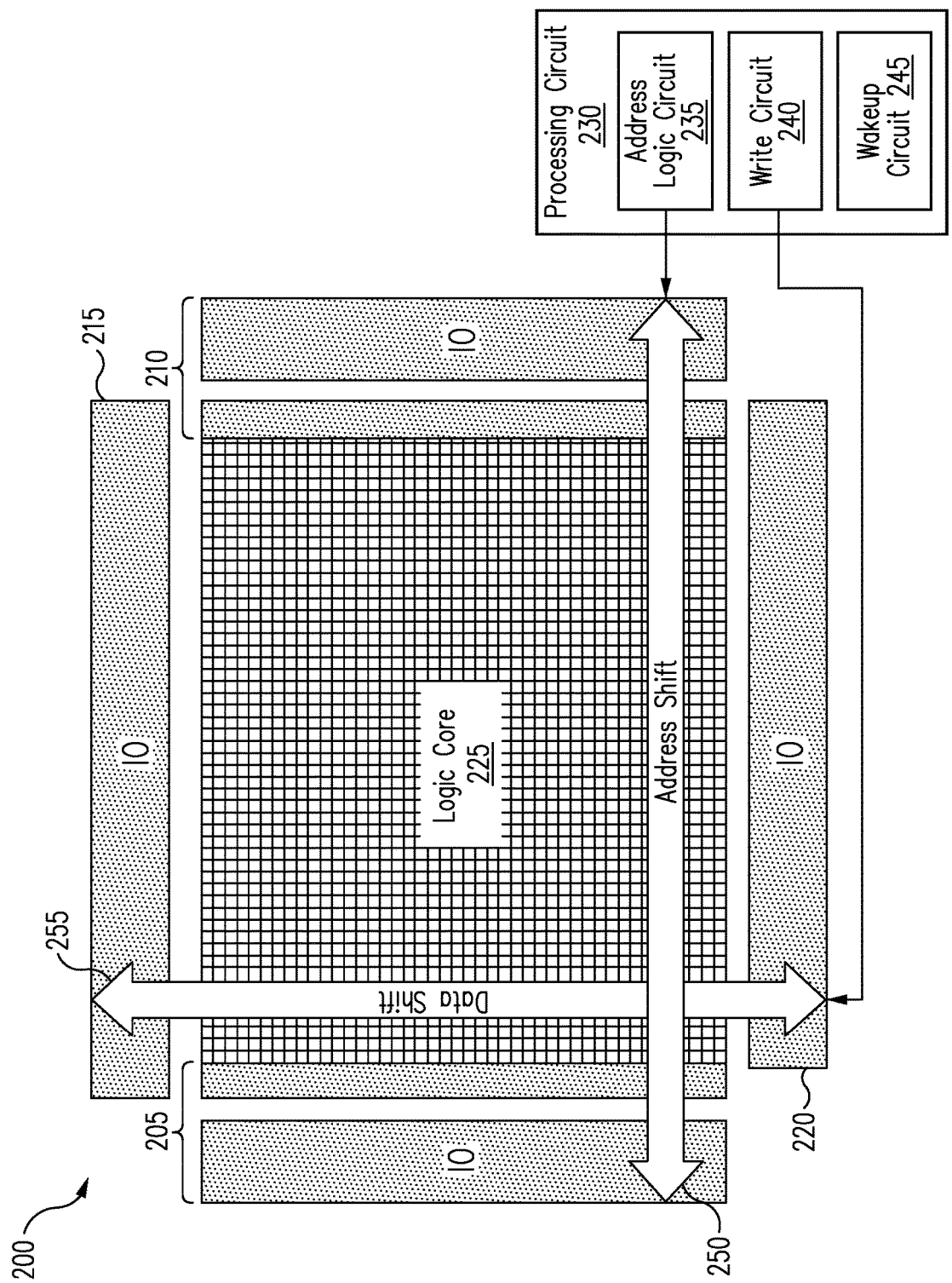
FIG. 2 illustrates a block diagram of a PLD with input/output fabric and logic fabric and an associated processing circuit in accordance with an embodiment of the disclosure.

FIG. 2 illustrates a block diagram of a PLD 200 with I/O fabric and logic fabric and an associated processing circuit 230 in accordance with an embodiment of the disclosure. The I/O fabric of the PLD 200 may be provided by I/O portions 205, 210, 215, and 220. The logic fabric of the PLD 200 may be provided by a logic core 225 (e.g., also referred to as an IC core). The I/O portions 205, 210, 215, and/or 220 may include logic, resources (e.g., routing resources), configuration memory usable for storing configuration data, and/or generally any components, that are associated with facilitating providing of the I/O fabric's functionality. Similarly, the logic core 225 may include logic, resources (e.g., routing resources), configuration memory usable for storing configuration data, and/or generally any components, that are associated with facilitating providing of the logic fabric's functionality.

In an embodiment, the PLD 200 may be, may include, or may be a part of the PLD 100. In an aspect, the I/O fabric of the PLD 200 may include the I/O blocks 102, SERDES blocks 150, PCS blocks 152, and associated circuitry (e.g., routing resources 180, clock-related circuitry 108, and/or connections thereto, etc.). In an aspect, the logic fabric may include the PLBs 104, hard IP blocks 160, and associated circuitry.

The configuration memory of the PLD 200 may include an array of configuration memory cells usable to store configuration data (e.g., each configuration memory cell may store one bit). The array of configuration memory cells may be arranged in rows and columns. In an aspect, the I/O portions 205, 210, 215, and/or 220 and the logic core 225 may include configuration memory cells (e.g., arranged in rows and columns) and form a portion of the array. The configuration memory cells may be volatile memory cells (e.g., RAM cells, such as SRAM cells). In some cases, the configuration memory cells may be referred to as configuration RAM (CRAM) cells. Although the present disclosure generally refers to various operations performed on rows and/or columns, rows may be used as columns and columns may be used as rows as appropriate. In an aspect, configuration memory cells associated with I/O and logic may be referred to as I/O block configuration memory cells and logic block configuration memory cells.

To configure (e.g., program) the PLD 200 (e.g., the I/O fabric and the logic fabric), the configuration data can be provided as a configuration bitstream that is loaded serially or in parallel into the configuration memory cells. In some cases, shifting may be performed serially, such as using JTAG or SPIx1 mode. Alternatively or in addition, in some cases, shifting may be in parallel, then followed by internally shifting parallel/serial, such as using SPIx4 mode or parallel x8 mode for example. The processing circuit 230 of the PLD 200 may include an address logic circuit 235 to assert an address (e.g., column address) of the PLD 200 and a data write circuit 240 to load corresponding configuration data into one or more configuration memory cells associated with the asserted address. For example, the address logic circuit 235 may be utilized to selectively assert columns of the array using respective address lines (not shown) to allow configuration data to be loaded into the configuration memory cells using the data write circuit 240.

In FIG. 2, the address logic circuit 235 may be, or may be utilized to control (e.g., using control signals), an address shifter to effectuate a column-by-column address shift (e.g., represented by address shift 250) across columns of the PLD

200. The data write circuit 240 may be, or may be utilized to control (e.g., using control signals), a data shifter to receive a portion of the configuration data corresponding to an asserted column and load the portion of the configuration data into corresponding configuration memory cells (e.g., represented by data shift 255) of the PLD 200. In this regard, the configuration data may be loaded into the PLD 200 one column at a time by pushing data to be written into a data shifter controlled by the data write circuit 240, asserting a column address using the address logic circuit 235 to allow data to be written into configuration memory cells associated with the asserted column address, and loading the data into these configuration memory cells. Such pushing of configuration data, asserting of column address, and loading of configuration data may be performed for each subsequent column of the PLD 200 until the columns of the configuration memory have been loaded with their corresponding configuration data.

In some cases, the configuration data may include configuration memory frames, with the configuration data being written frame-by-frame into the configuration memory. For example, each configuration memory frame may include configuration data for one column of the PLD 200, with each configuration memory frame being shifted into a corresponding column of the configuration memory.

The processing circuit 230 of the PLD 200 may include a wakeup circuit 245 to wake up (e.g., activate) functionality of the I/O fabric and logic fabric after the configuration data have been loaded into the configuration memory cells associated with (e.g., utilized to implement) the I/O fabric and logic fabric. In an aspect, wakeup may refer to transitioning the PLD 200 from a configuration mode, in which configuration data is being loaded into the PLD 200, to a functional mode (e.g., also referred to as operational mode), in which the PLD 200 provides I/O and logic functionality. In this regard, after wakeup of the PLD 200 is complete, the PLD 200 is configured to operate using its I/O and logic fabric to provide I/O and logic functionality in accordance with user-specified applications. Such I/O and logic functionality may be effectuated through use of associated logic, resources (e.g., routing resources), stored configuration data, and/or other associated components. In some cases, a portion of the I/O fabric may provide static state control whereas another portion of the I/O fabric may be driven by (e.g., controlled by) the logic fabric.

In an embodiment, the processing circuit 230 may be, may include, or may be part of configuration and activation logic circuitry to receive configuration data, configure configuration memory cells of the PLD 200, and activate functionality of the I/O fabric and/or logic fabric associated with the configuration memory cells. In some cases, at least a portion of such circuitry is hardcoded in the PLD 200. For example, the address logic circuit 235, data write circuit 240, and wakeup circuit 245 may be hardcoded in the PLD 200.

In one or more embodiments, configuration data can be loaded into a portion of a PLD and wakeup of these configured portions of the PLD may be performed to facilitate fast boot of some functionality of the PLD. In this regard, configured portions (e.g., also referred to as programmed portions) of the PLD may refer to portions of the array of configuration memory cells of the PLD into which a corresponding portion of configuration data has been loaded. Fast boot may allow designated functionality to be provided by configured portions of the PLD while other portions of the PLD are still being configured (e.g., configuration data is being loaded into these non-configured portions). In some aspects, the functionality designated for fast boot may include designated I/O functionality and, in some cases, designated core logic functionality to be provided by the PLD faster than in a case that the PLD waits for an entirety of the PLD to be configured before waking up any portion of the PLD.

In some aspects, a manufacturer of the PLD may define portion(s) (e.g., physical locations) of the PLD designated for fast boot. The portions of the PLD designated for fast boot may correspond to a subset of the array of configuration memory cells of the PLD. As such, the configuration memory cells in the subset may be loaded with configuration data prior to configuration memory cells not part of the subset to allow early configuration and wakeup of functionality associated with the subset. In some cases, the manufacturer may indicate (e.g., on a datasheet) which portions of the PLD are designated for fast boot. A user (e.g., a designer) may generate a user design in accordance with these designations from the manufacturer to leverage fast boot capability. For example, for a given user-specified application, a user may identify I/O and/or logic functionality considered by the user to be the most time sensitive and/or critical functionality to cause generation of a layout with such functionality provided in the portions of the PLD designated for fast boot (e.g., to be configured and activated prior to other portions of the PLD).

In implementing fast boot, portions of the PLD, such as portions of the I/O fabric and, in some cases, the logic fabric, may be configured into a known state and activated faster than in a case that the entire PLD is configured prior to wakeup. In some cases, the portions of the PLD designated for fast boot may be configured into a known state once a few frames of the configuration bitstream is loaded into the PLD and an associated wakeup performed to activate associated functionality. For example, the portions of the I/O fabric that are activated due to the fast boot may drive to a proper polarity and with desired driver characteristics (e.g., I/O type, drive strength, pull up/down feature, etc.), such as to effectuate control of a component (e.g., fan, LED) by the PLD.

Figure 3A:
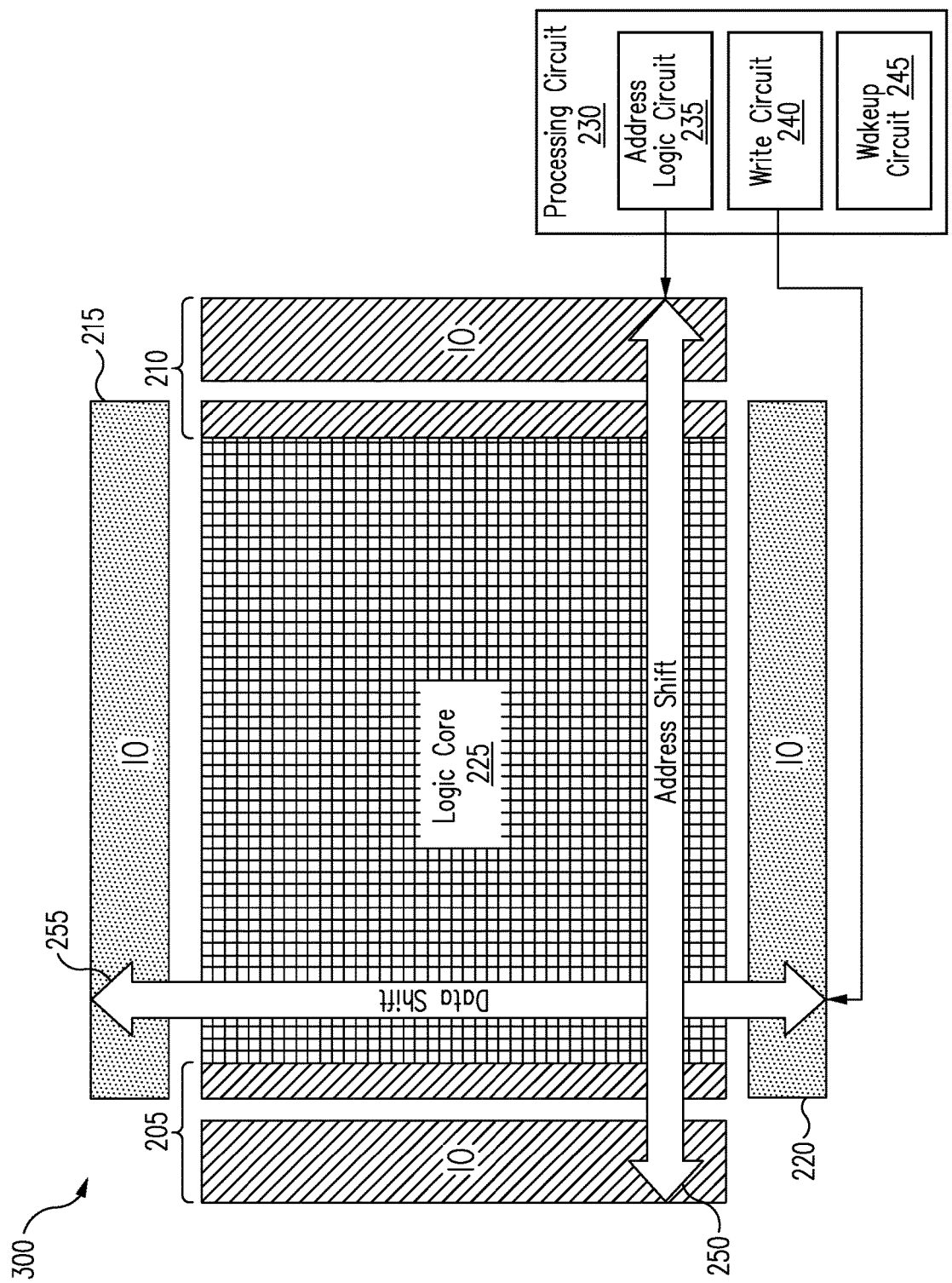
FIGS. 3A-3C illustrates block diagrams of a PLD with input/output portions designated for fast boot at various stages of configuration and wakeup in accordance with an embodiment of the present disclosure.
Figure 3B:
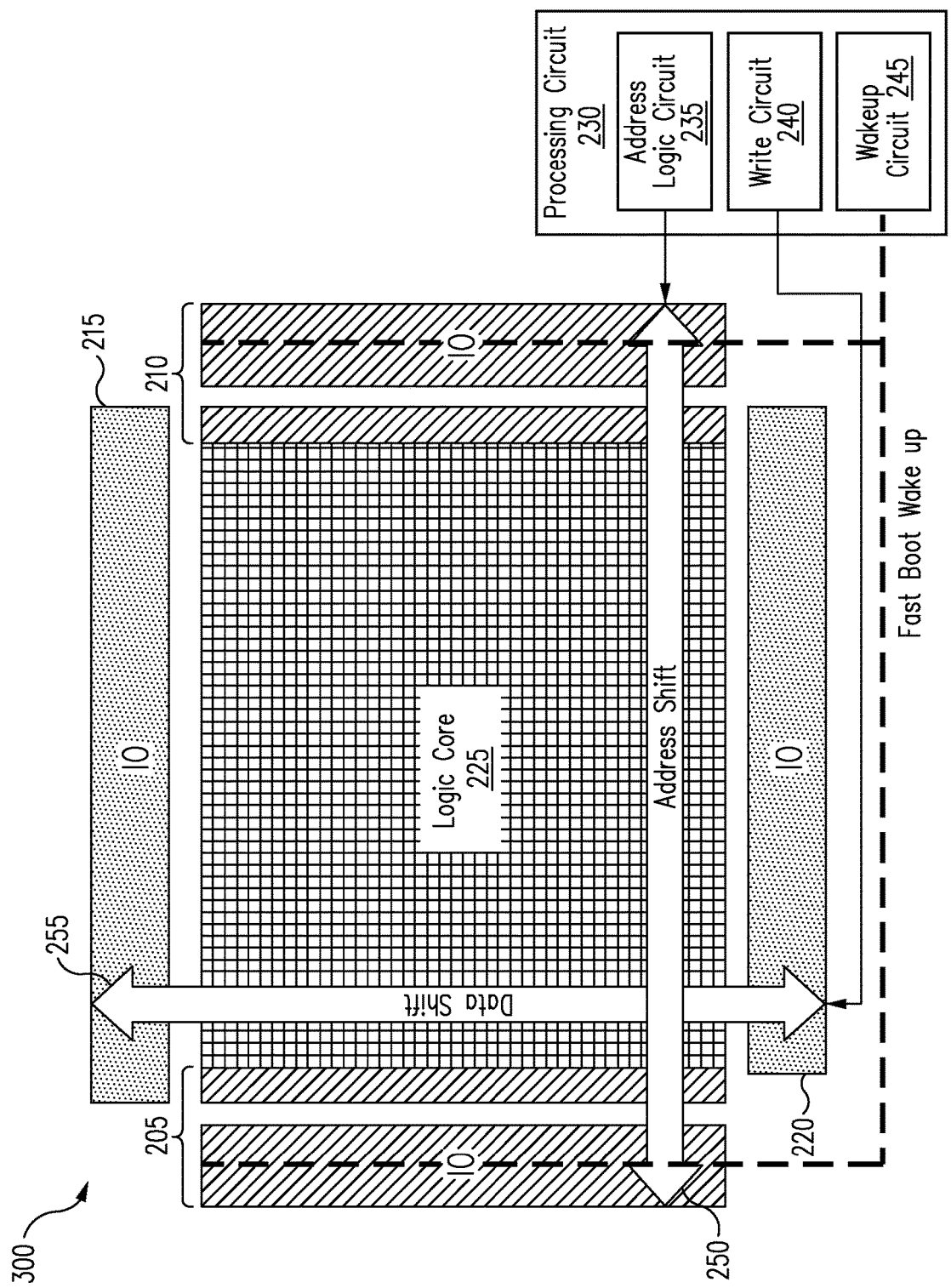
Figure 3C:
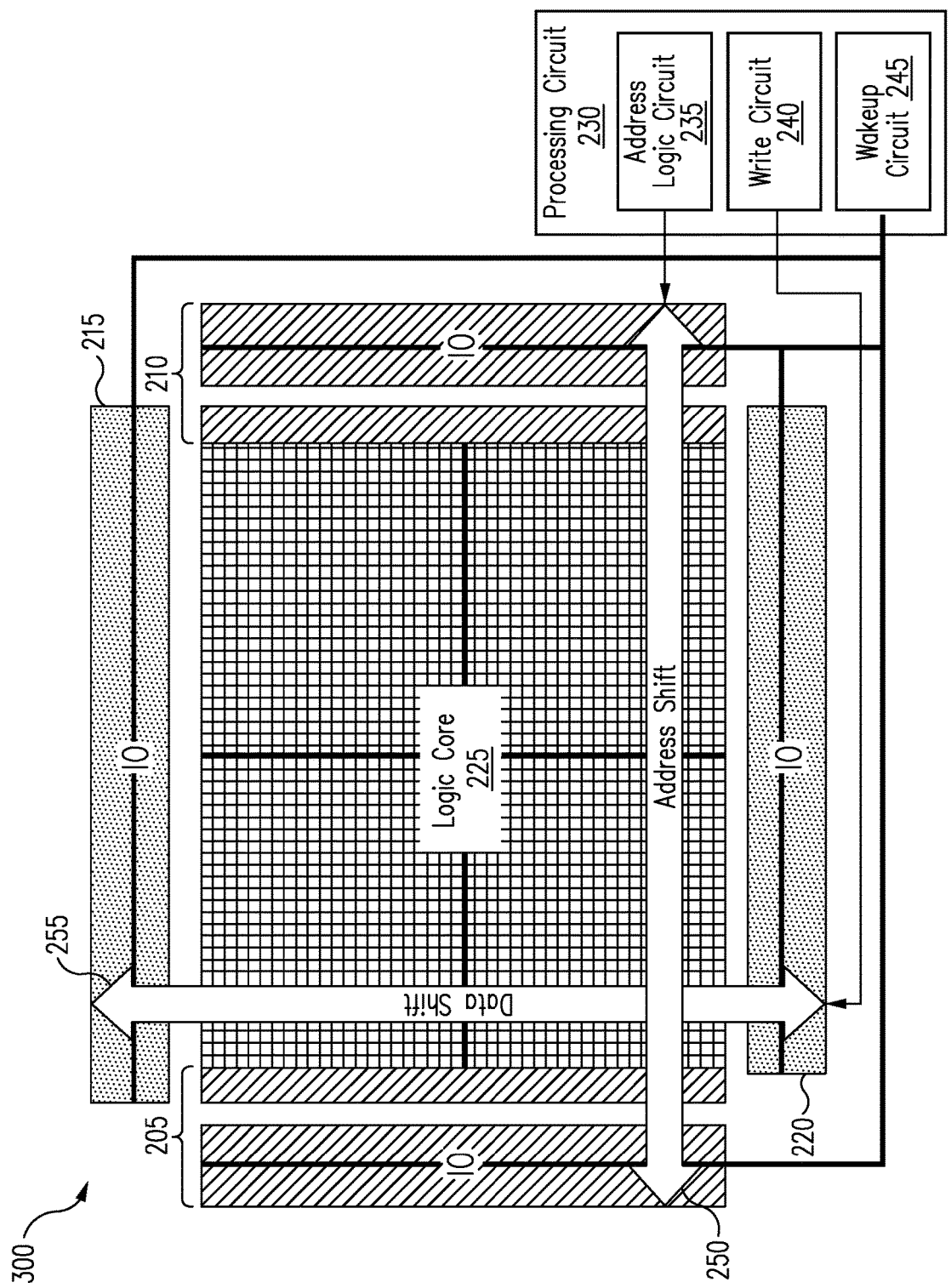

FIGS. 3A-3C illustrates block diagrams of a PLD 300 with I/O portions 205 and 210 designated for fast boot at various stages of configuration and wakeup in accordance with an embodiment of the present disclosure. The PLD 300 also includes I/O portions 215 and 220 and logic core 225 that are not designated for fast boot. In an embodiment, the PLD 300 may be the same as the PLD 200 except with the I/O portions 205 and 210 designated for fast boot. In some cases, the I/O portions 205 and 210 may be designated for fast boot by a manufacturer of the PLD 200. To leverage the fast boot capability, the user may associate I/O functionality with the I/O portions 205 and/or 210 based on criteria (e.g., time sensitivity and/or importance of functionality) and associate other I/O functionality (e.g., less time-sensitive and/or less critical) with the I/O portions 215 and/or 220.

The processing circuit 230 effectuates the fast boot by providing (e.g., using the address logic circuit 235 and data write circuit 240) configuration data to configuration memory cells of the I/O portions 205 and 210 and, upon configuring the I/O portions 205 and 210, activating, using the wakeup circuit 245, the portion of the I/O fabric associated with the I/O portions 205 and 210. Upon waking up the portion of the I/O fabric, the portion of the I/O fabric may provide its associated I/O functionality. After functionality associated with the I/O portions 205 and 210 are activated, the processing circuit 230 may configure and activate the other portions 215, 220, and 225 of the PLD 200.

As an example, to configure the PLD 300, the addresses associated with the I/O portion 205 may be asserted one at a time (e.g., starting with a leftmost column) and a configuration memory frame loaded into the asserted column until all columns of the I/O portion 205 are configured. In some cases, column addresses may be asserted such that contiguous columns are asserted from one iteration to the next iteration. The addresses associated with the I/O portion 210 may be asserted one at a time and a configuration memory frame loaded into the asserted column until all columns of the I/O portion 210 are configured. In some cases, configuration time associated with configuration of the I/O portions 205 and 210 may be facilitated (e.g., made more time efficient) through writing of the configuration bitstream frame-by-frame. For example, a first set of frames of the configuration bitstream (e.g., frames earlier in the bitstream) may be loaded into the I/O portion 205 and a last set of frames of the bitstream (e.g., frames toward an end of the bitstream) may be loaded into the I/O portion 210.

As shown in FIG. 3B, once the I/O portions 205 and 210 are configured, the wakeup circuit 245 may generate and provide a wakeup signal to wake up the portions of the I/O fabric associated with the I/O portions 205 and 210 such that the portions of the I/O fabric may provide their functionality. In waking up the portions of the I/O fabric, the portions of the I/O fabric transition from a configuration mode to a fast boot operation mode such that the portions of the I/O fabric perform I/O functionality (e.g., as defined by the user). In this regard, such I/O functionality may be referred to as fast boot static state control. Configuration data associated with such I/O functionality are stored in the configuration memory cells of the I/O portions 205 and 210.

As an example, the I/O functionality may include causing an LED controlled by the I/O fabric of the PLD 300 to turn on. In this example, by designating such I/O functionality for fast boot, the I/O functionality for controlling the LED by the PLD 300 may be defined earlier than in a case that the I/O functionality is provided after the entire PLD 300 is configured, thus reducing any flickering or misbehavior of the LED prior to the I/O functionality being placed in a defined state to control the LED.

To configure a remaining portion of the PLD 300, the processing circuit 230 may use the address logic circuit 235 and data write circuit 240 to load configuration data into configuration memory cells of the I/O portions 215 and 220 and logic core 225. In some cases, the I/O functionality associated with the I/O portions 205 and 210 may be in the process of being wakened up while configuration data is starting to be loaded into the remaining configuration memory of the remaining portions 215, 220, and 225 of the PLD 300. In other cases, the I/O functionality is finished waking up prior to configuration data starting to be loaded into the remaining configuration memory of the PLD 300.

In some embodiments, the I/O portions 215 and 220 and logic core 225 may be configured in any order and/or using any orientation (e.g., row-by-row, column-by-column, or any other manner). As an example, in configuring the logic core 225, the address logic circuit 235 and data write circuit 240 may be configured as appropriate to assert rows or columns and load in associated configuration data based on the number of rows or columns of configuration memory cells in the logic core 225. In some cases, in FIG. 3B, shifting column-by-column may be more efficient (e.g., faster, uses fewer address shifting, etc.) due to sharing of the address and data shift units (e.g., 250, 255) utilized when configuring the I/O portions 205 and 210 designated for fast boot.

In some cases, configuration of the I/O portions 215 and 220 may be segmented. For example, in FIG. 3B, some columns of the I/O portion 205 overlap with columns of the I/O portions 215 and 220, and similarly some columns of the I/O portion 210 overlap with columns of the I/O portions 215 and 220. The processing circuit 230 may use the address logic circuit 235 and data write circuit 240 to load the configuration data column-by-column into the I/O portions 215 and 220. In one example, the address shift 250 and data shift 255 may be used such that a column of the I/O portions 215 and 220 is asserted and associated configuration data loaded into configuration memory cells of the I/O portions 215 and 220 (e.g., and not the configuration memory cells of the I/O portions 205 and 210) for the asserted column. In another example, the address shift 250 and data shift 255 may be used to assert each column of the I/O portion 215 and load associated configuration data into the I/O portion 215, and then the address shift 250 and data shift 255 may be used to assert each column of the I/O portion 220 and load associated configuration data into the I/O portion 215. In other cases, the address logic circuit 235 and data write circuit 240 may rotate their orientation such that the address logic circuit 235 asserts the I/O portions 215 and 220 row-by-row and the data write circuit 240 loads configuration data for the asserted row.

Other manners by which to configure the remaining portions 215, 220, and 225 may be utilized and may be selected based on criteria, such as speed considerations, complexity (e.g., number of operations), etc. Different portions of the PLD 300 may be configured using data and address shifts in different orientations (e.g., rotations) and/or with segmented data shift.

As shown in FIG. 3C, after the configuration data is loaded into the configuration memory cells of the remaining portions 215, 220, and 225 of the PLD 300, the wakeup circuit 245 generates and provides a wakeup signal for the PLD 300 that allows wake up of I/O and logic functionality of the PLD 300. In this regard, the portion of the I/O fabric associated with fast boot may transition from the fast boot operation mode to a system operation mode associated with the PLD 300. The logic fabric and the remaining portion of the I/O fabric may transition from the configuration mode to the full system operation mode of the PLD 300. In some cases, the portion of the I/O fabric associated with fast boot may have different functionality at the time of fast boot relative to the time at which the entire PLD 300 is configured. For example, a portion of the I/O fabric may provide static state control in the fast boot operation mode and then transition to logic-controlled I/O in the full system operation mode. In this regard, such portion of the I/O fabric may provide I/O functionality based on signals provided to the I/O fabric from the logic fabric.

Although examples are given above with regard to loading configuration data into the I/O portions 205 and 210 for fast boot configuration and activation and the remaining portions 215, 220, and 225 for normal configuration and activation, the configuration data may be loaded into the I/O portions 205 and 210 in any manner such that the I/O portions 205 and 210 are configured and subsequently the configuration data may be loaded into the remaining portions 215, 220, and 225 in any manner such that the remaining portions 215, 220, and 225 are configured. For example, the configuration data need not be loaded one column or row at a time into these portions 205, 210, 215, 220, and 225. In addition, although FIGS. 3A-3C show the address shift 250 and the data shift 255, multiple address shifts and multiple data shifts may be operated (e.g., serially or in parallel, synchronously or independently) to configure the I/O portions 205 and 210 for fast boot and/or the remaining portions 215, 220, and 225 afterwards.

Figure 4:
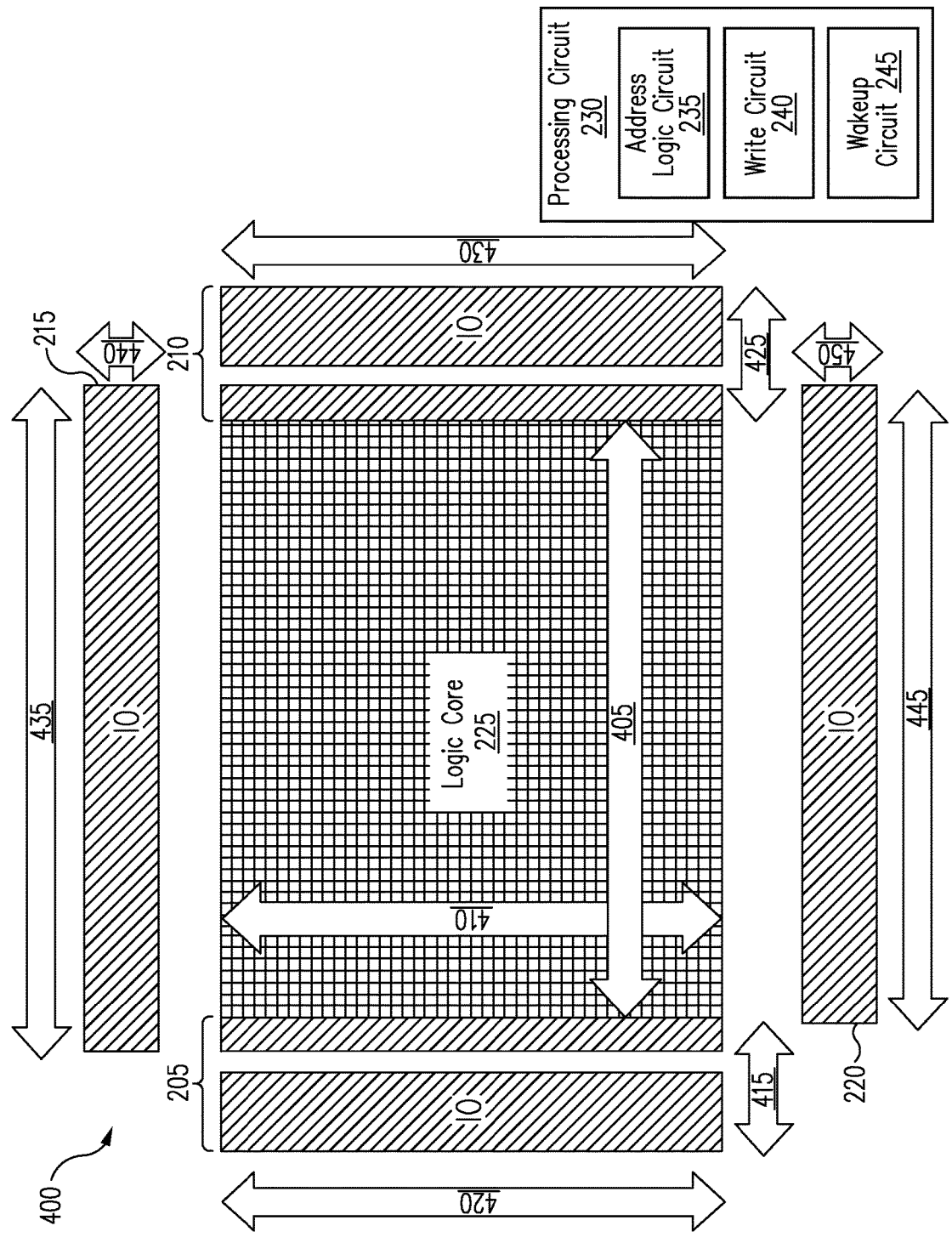
FIG. 4 illustrates a block diagram of a PLD with input/output portions designated for fast boot in accordance with an embodiment of the present disclosure.

FIG. 4 illustrates a block diagram of a PLD 400 with the I/O portions 205, 210, 215, and 220 designated for fast boot in accordance with an embodiment of the present disclosure. The description of FIGS. 3A-3C generally applies to FIG. 4, with examples of differences and other description provided herein. In an embodiment, the PLD 400 may generally be the same as the PLD 200 except with the I/O portions 205, 210, 215, and 220 designated for fast boot.

To configure the PLD 400 for fast boot operation, various address shifts and data shifts (represented by 415, 420, 425, 430, 435, 440, 445, and 450) may be utilized to configure the I/O portions 205, 210, 215, and 220. Upon configuring the I/O portions 205, 210, 215, and 220, the I/O fabric of the PLD 200 may be activated to provide I/O functionality of the PLD 400, thus transitioning the I/O fabric of the PLD 400 from a configuration mode to a fast boot operation mode. In conjunction with or after activating the I/O functionality, an address shift and a data shift (represented by 405 and 410) may be utilized to configure the logic core 225. The logic functionality associated with the logic fabric of the PLD 400 may be activated to transition from the configuration mode to a full system operation mode of the PLD 400. The I/O functionality may transition from the fast boot operation mode to the full system operation mode.

The various address shifts and data shifts may be, or may be controlled by, the address logic circuit 235 and data write circuit 240. Control signals from the address logic circuit 235 and data write circuit 240 are not shown in FIG. 4 for purposes of clarity. In FIG. 4, the various address shifts and data shifts are perpendicular to each other. Different combinations of orientations may be utilized for the address shifts and data shifts. As one example, the shift 415 may be an address shift (e.g., column address shift) and shift 420 may be a data shift (e.g., shifting in data one column at a time). As another example, the shift 420 may be an address shift (e.g., row address shift) and shift 415 may be a data shift (e.g., shifting in data one row at a time).

In some cases, one or multiple address shifters and data shifters may be utilized for configuring the I/O portions 205, 210, 215, and 220 and logic core 225. As an example, when the I/O portions 215 and 220 are configured column-by-column, the shifts 435 and 445 may be implemented by a single column address shift and the shifts 440 and 450 may be a single data shifter for loading in configuration data of an asserted column. As another example, when the I/O portions 215 and 220 are configured column-by-column, the shifts 435 and 445 may be implemented by two (or more) column address shifters and the shifts 440 and 450 may be a two (or more) data shifters for loading in configuration data of two (or more) simultaneously asserted columns. In this latter example, the shifts 435 and 445 may operate independently of each other (e.g., the shifts 435 and 445 may be asserting different columns). Fewer, more, and/or different shifts other than those shown in FIG. 4 may be utilized.

Figure 5:
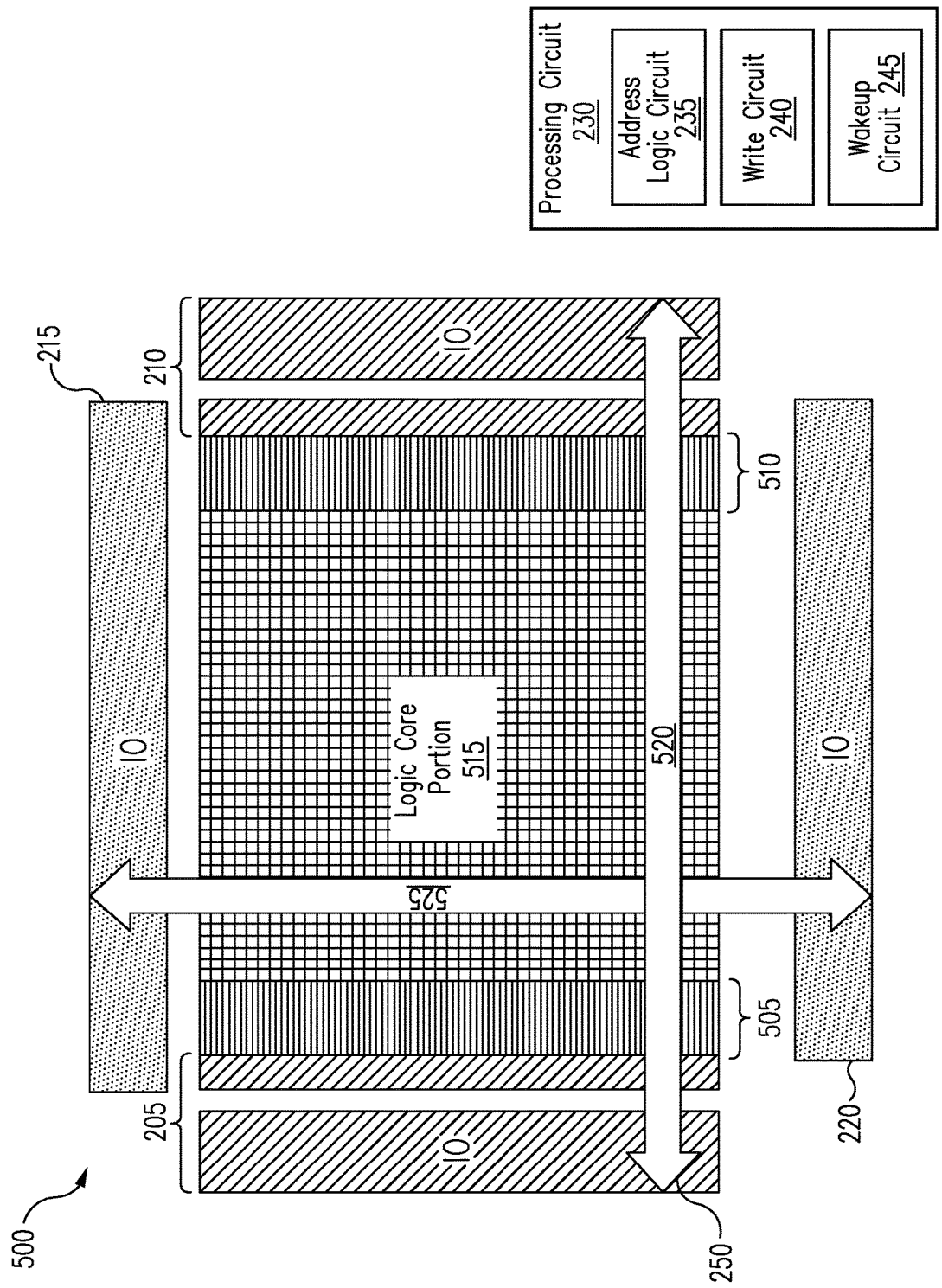
FIGS. 5 and 6 illustrate block diagrams of PLDs with input/output and logic core portions designated for fast boot in accordance with an embodiment of the present disclosure.

FIG. 5 illustrates a block diagram of a PLD 500 with the I/O portions 205 and 210 and logic core portions 505 and 510 designated for fast boot in accordance with an embodiment of the present disclosure. The description of FIGS. 3A-3C generally applies to FIG. 5, with examples of differences and other description provided herein. In an embodiment, the PLD 500 may generally be the same as the PLD 200 except with the I/O portions 205 and 210 and logic core portions 505 and 510 designated for fast boot.

The logic core 225 may include logic core portions 505, 510, and 515. To configure the PLD 500 for fast boot, an address shift (e.g., 520) and a data shift (e.g., 525) may be utilized to configure the I/O portions 205 and 210 and logic core portions 505 and 510. In one example, the address shift may begin configuration by asserting a left-most column of the I/O portion 205 and moving rightwards to a right-most column of the logic core portion 505, and then begin configuration of the I/O portion 210 and logic core portion 510.

Upon configuring the portions 205, 210, 505, and 510, the associated portion of the I/O fabric and logic fabric of the PLD 500 may be activated to provide associated I/O and logic functionality of the PLD 500, thus transitioning the portion of the I/O fabric and logic fabric from a configuration mode to a fast boot operation mode. In this case, the portion of the I/O fabric may provide static state control and/or logic controlled I/O. In conjunction with or after waking up the portion of the I/O and logic functionality, one or more address shifts and/or data shifts may be utilized to load configuration data into configuration memory cells of the logic core portion 515 and I/O portions 215 and 220 to configure the portions 215, 220, and 515. The I/O and logic functionality of the PLD 500 may be activated to transition to the full system operation mode of the PLD 500. Other manners (e.g., orders, orientations) by which to configure the I/O portions 205, 210, 215, and 220 and logic core portions 505, 510, and 515 may be utilized.

Figure 6:
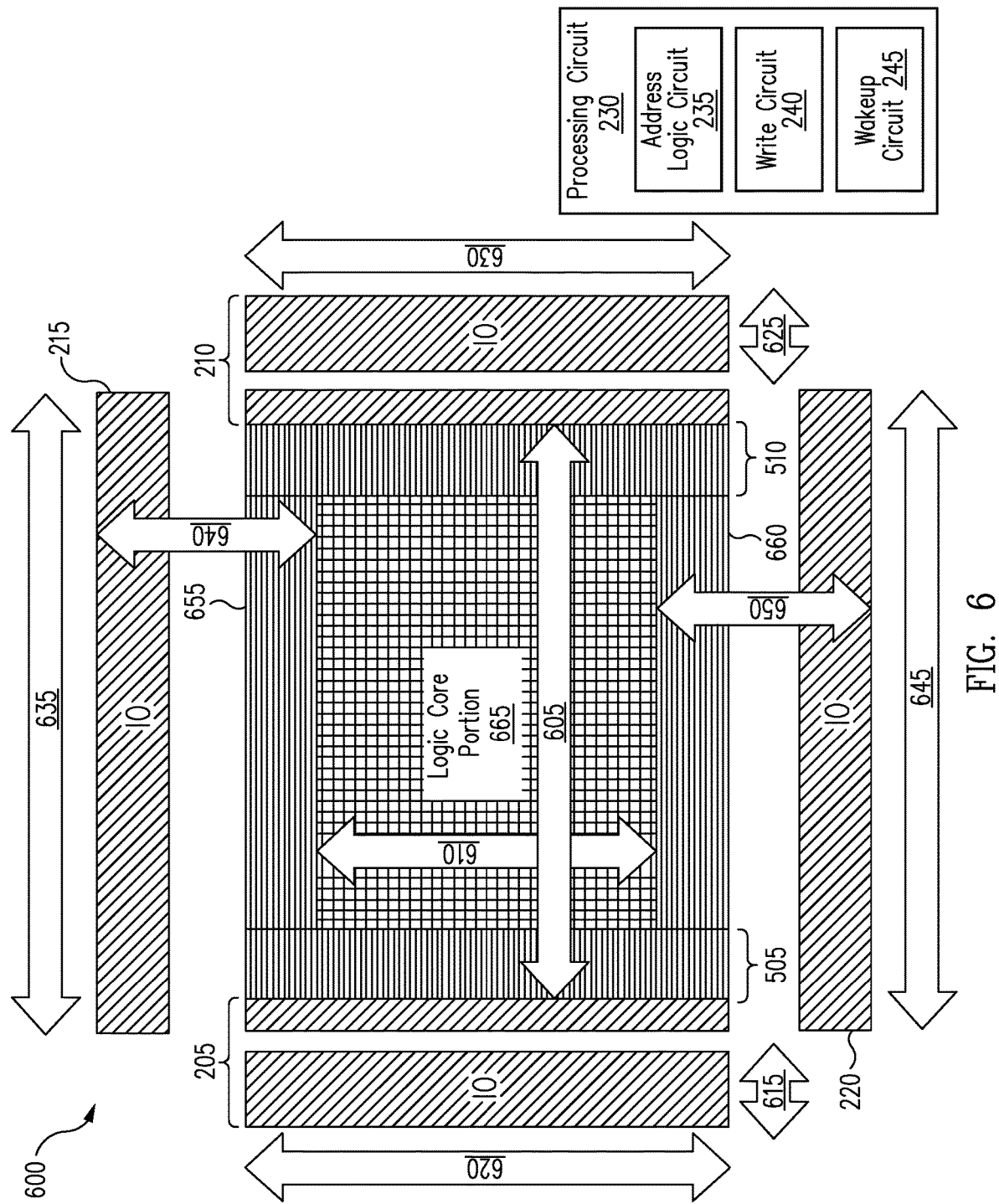

FIG. 6 illustrates a block diagram of a PLD 600 with the I/O portions 205, 210, 215, and 220 and logic core portions 505, 510, 655, and 660 designated for fast boot in accordance with an embodiment of the present disclosure. The description of FIGS. 3A-3C generally applies to FIG. 6, with examples of differences and other description provided herein. In an embodiment, the PLD 600 may generally be the same as the PLD 200 except with the I/O portions 205, 210, 215, and 220, and logic core portions 505, 510, 655, and 660 designated for fast boot.

To configure the PLD 600 for fast boot operation, various address shifts and data shifts (represented by 615, 620, 625, 630, 635, 640, 645, and 650) may be utilized to configure the I/O portions 205, 210, 215, and 220 and the logic portions 655 and 660. In conjunction with or after waking up the portion of the I/O and logic functionality associated with the portions 205, 210, 215, 220, 655, and 660, shifts 605 and 610 may be utilized to configure a logic core portion 665. The I/O and logic functionality of the PLD 600 may then be activated to transition to the full system operation mode of the PLD 600.

Although FIGS. 3A-3C and 4-6 show examples of a PLD with I/O portions and/or logic portions being designated for fast boot, in some cases different I/O and logic portions may be defined in the PLD. For example, the I/O portion 205 may include a first portion designated for fast boot and a second portion not designated for fast boot. As indicated previously, more, fewer, and/or different address shifts and/or data shifts may be utilized to configure the PLD. In addition, although the foregoing describes the configuration memory cells of the I/O portions and/or logic core portions in terms of rows and columns with configuration memory cells designated for fast boot being provided by contiguous rows/columns, in some cases the configuration memory cells designated for fast boot may be distributed in other manners and need not be in contiguous columns/rows.

Figure 7:
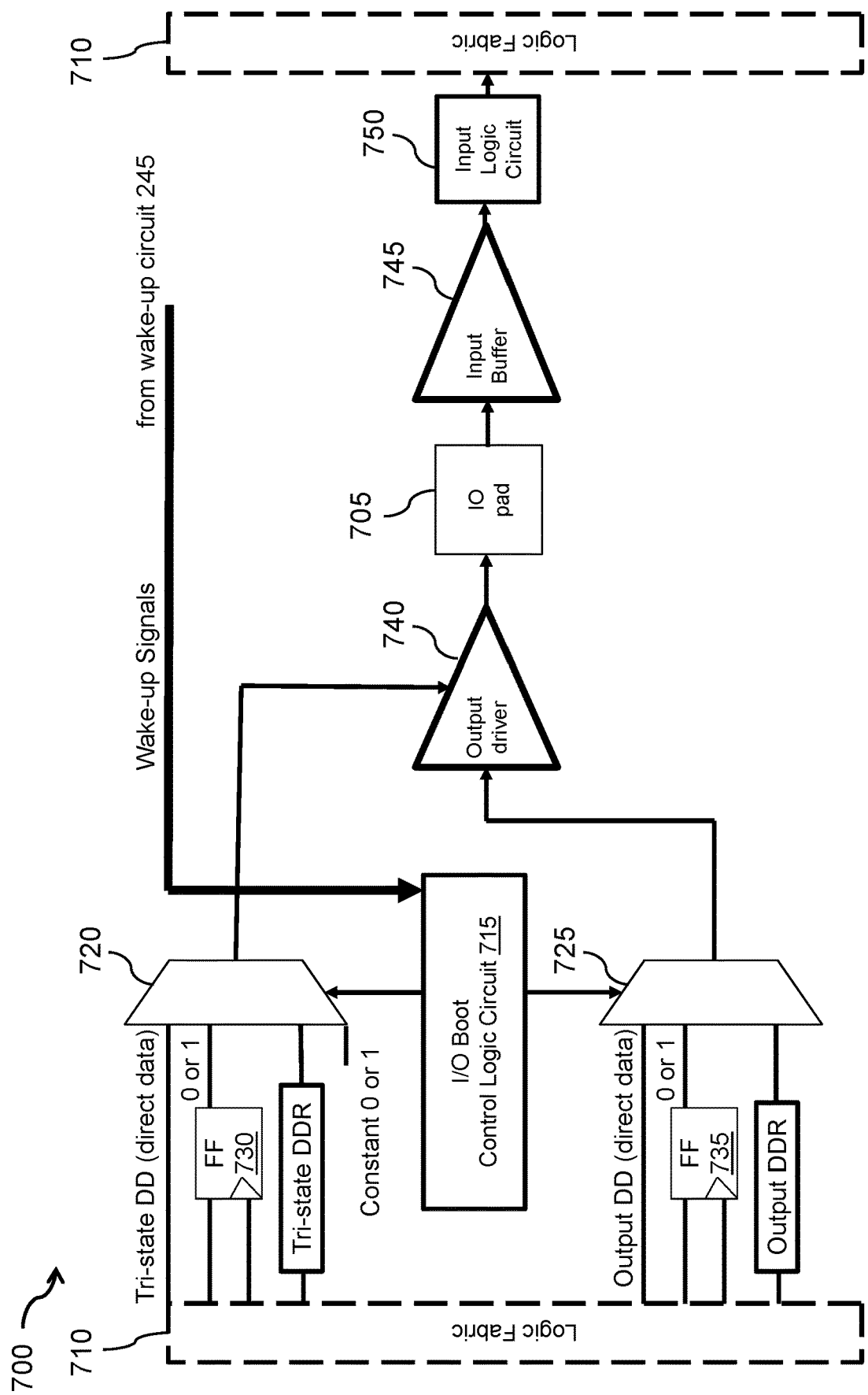
FIG. 7 illustrates a block diagram of an input/output control circuit for activating and providing input/output functionality in accordance with an embodiment of the disclosure.

FIG. 7 illustrates a block diagram of an I/O control circuit 700 for activating and providing I/O functionality in accordance with an embodiment of the disclosure. The I/O control circuit 700 of FIG. 7 is primarily described with reference to the PLD 300 of FIGS. 3A-3C in which the I/O portions 205 and 210 are designated for fast boot, although the I/O control circuit 700 may also be utilized with other designations of I/O and/or control functionality such as those in FIGS. 4-6. For discussion purposes, the I/O control circuit 700 is associated with a portion of an I/O fabric of the PLD 300 designated for fast boot.

The I/O control circuit 700 includes an I/O pad 705 coupled to a logic fabric 710 via an output path or an input path. In an aspect, the logic fabric 710 may be provided by the logic core 225. In some cases, a portion of the I/O control circuit 700 may be hardcoded in to the PLD 200, such as logic of an I/O boot control logic circuit 715, output driver 740, and/or input logic circuit 750.

With reference to the PLD 300, once the I/O portions 205 and 210 are configured (e.g., loaded with configuration data), the I/O boot control logic circuit 715 may receive a wakeup signal (e.g., from the wakeup circuit 245) and generate control signals in response to the wakeup signal to wake up of the I/O functionality associated with the I/O portions 205 and 210. The control signals may be utilized as selector signals to control operation of multiplexers 720 and 725. In this regard, the multiplexer 720 is coupled to four input lines: tri-state direct data (DD) line, flip-flop line, tri-state double data rate (DDR) line, and constant value line. The multiplexer 725 is coupled to three input lines: output DD line, output flip-flop line, and output DDR line. In some cases, the DD line and DDR line for the multiplexers 720 and 725 allow logic-driven I/O functionality. In FIG. 7, the control signals of the I/O boot control logic circuit 715 may be selector signals to select one of the four input lines of the multiplexer 720 and one of the three input lines of the multiplexer 725.

In some aspects, to facilitate fast boot operation, the I/O boot control logic circuit 715 may generate control signals to cause selection of the flip-flop lines of the multiplexers 720 and 725 or the constant value line of the multiplexer 720. Values (e.g., 0 or 1) stored in flip-flops 730 and 735 are provided on the flip-flop lines. In some cases, the flip-flops 730 and/or 735 may store a bit (e.g., 0 or 1 value) of the configuration bitstream. In other cases, the flip-flops 730 and/or 735 may store a bit (e.g., 0 or 1) that is hardcoded into memory of the PLD 300. In an aspect, when a portion of the logic fabric designated for fast boot operation (e.g., PLD 500 and 600) is configured, the I/O boot control logic circuit 715 may generate control signals to cause selection of the flip-flop lines, constant value line (e.g., for the multiplexer 720), DDR line, or DD line, such as based on logic provided by the portion of the logic fabric to allow logic-driven I/O functionality.

An output of the multiplexer 720 (e.g., the value stored in the flip-flop 730) may enable an output driver 740 to drive a value onto the I/O pad 705 or disable (e.g., put in tri-state) the output driver 740. When the output driver 740 is enabled for driving, the output driver 740 drives a value provided by an output of the multiplexer 725 (e.g., the value stored in the flip-flop 735) to the output driver 740 onto the I/O pad 705. For example, when the flip-flop 730 stores a 1, the output driver 740 may be enabled and the value (e.g., 0 or 1) stored in the flip-flop 735 is provided to the output driver 740 and driven (e.g., to logic low or logic high) onto the I/O pad 705 by the output driver 740. When the flip-flop 730 stores a 0, the output driver 740 may be disabled and any value received by the output driver 740 from the flip-flop 735 is not driven onto the I/O pad 705 by the output driver 740. In an aspect, when the output driver 740 is disabled, the output driver 740 may be referred to as being in tri-state or high-impedance mode.

As an example, the I/O pad 705 may be coupled to a component (e.g., a fan, an LED) controlled by the I/O fabric of the PLD 300. When a value of 0 (e.g., converted to a logic low) is driven onto the I/O pad 705, the component may be off (e.g., turned off if the component is turned on or remain off if the component is already off). When a value of 1 (e.g., converted to a logic high) is driven onto the I/O pad 705, the component may be on (e.g., turned on if the component is turned off or remain on if the component is already on).

On the input side, the I/O pad 705 may receive signals from an external component connected to the PLD 300. An input buffer 745 may receive the signals from the external component via the I/O pad 705 and provide the signals to the input logic circuit 750. The input logic circuit 750 may process the received signals and provide the processed signals to the logic fabric 710 to perform associated logic. In some cases, such as when logic functionality is not designated for fast boot, the input path is generally not used during fast boot operation since logic functionality provided by the PLD 300 has not been activated. In other cases, such as when a portion of the logic functionality is designated for fast boot, the input path may be utilized to receive signals from an external component and provide to the logic fabric 710 for processing.

Once the entirely of the PLD 300 is configured, the wakeup circuit 245 may provide a wakeup signal to transition the I/O and logic fabric to the full system operation mode. In transitioning from the fast boot operation mode to the full system operation mode, the I/O boot control logic circuit 715 may generate control signals to cause the multiplexers 720 and/or 725 to select from one of their respective input lines in accordance with a user-specified application, as shown in Table 1. In this regard, the I/O boot control logic circuit 715 may, but need not, select the flip-flop input lines.

TABLE 1

| Fast boot | Normal | Notes |
|---|---|---|
| FF | FF | Preferred |
| FF | DD | Reset to same value as that |
| FF | DDR | provided by FF |

In one case, the I/O functionality effectuated through use of the I/O pad 705 and other components of the I/O logic control circuit 700 may remain unchanged between the fast boot operation mode and the full system operation mode. In this case, for example, the I/O boot control logic circuit 715 may generate control signals to cause the multiplexers 720 and 725 to select the flip-flops lines during the fast boot operation mode and the full system operation mode. Such I/O functionality may provide static state control in both the fast boot and full system operation modes.

In another case, the I/O functionality effectuated through use of the I/O pad 705 may differ between the fast boot operation mode and the full system operation mode. In this case, the I/O boot control logic circuit 715 may generate control signals to cause the multiplexers 720 and/or 725 to transition from selecting the flip-flop line to one of the other input lines, such as one of the DD, flip-flop, DDR, or constant value line. In an embodiment, to facilitate transition (e.g., seamless transition, glitchless transition) from the fast boot operation mode to the full system operation mode, DD or DDR values provided by the logic fabric 710 on the corresponding input lines of the multiplexers 720 and/or 725 may be reset to the same values as those stored in the flip-flops 730 and 735. After reset, the logic fabric 710 may provide onto the DD or DDR lines values according to a user-specified application, where such values on the DD or DDR lines may be different from the values stored in the flip-flops 730 and 735. For example, such logic-controlled I/O may be effectuated after a predetermined (e.g., threshold) amount of time after transitioning into the full system operation mode has elapsed to facilitate the transition.

Although FIG. 7 is described with respect to I/O designated for fast boot, in some cases the I/O control circuit 700 may be utilized with I/O not designated for fast boot. In such cases, the I/O boot control logic circuit 715 does not receive or does not respond to a wakeup signal associated with fast boot. The I/O boot control logic circuit 715 may generate control signals to control the multiplexers 720 and 725 (and thus control the output and input sides) in response to a wakeup signal received after the entire PLD has been configured.

Figure 8:
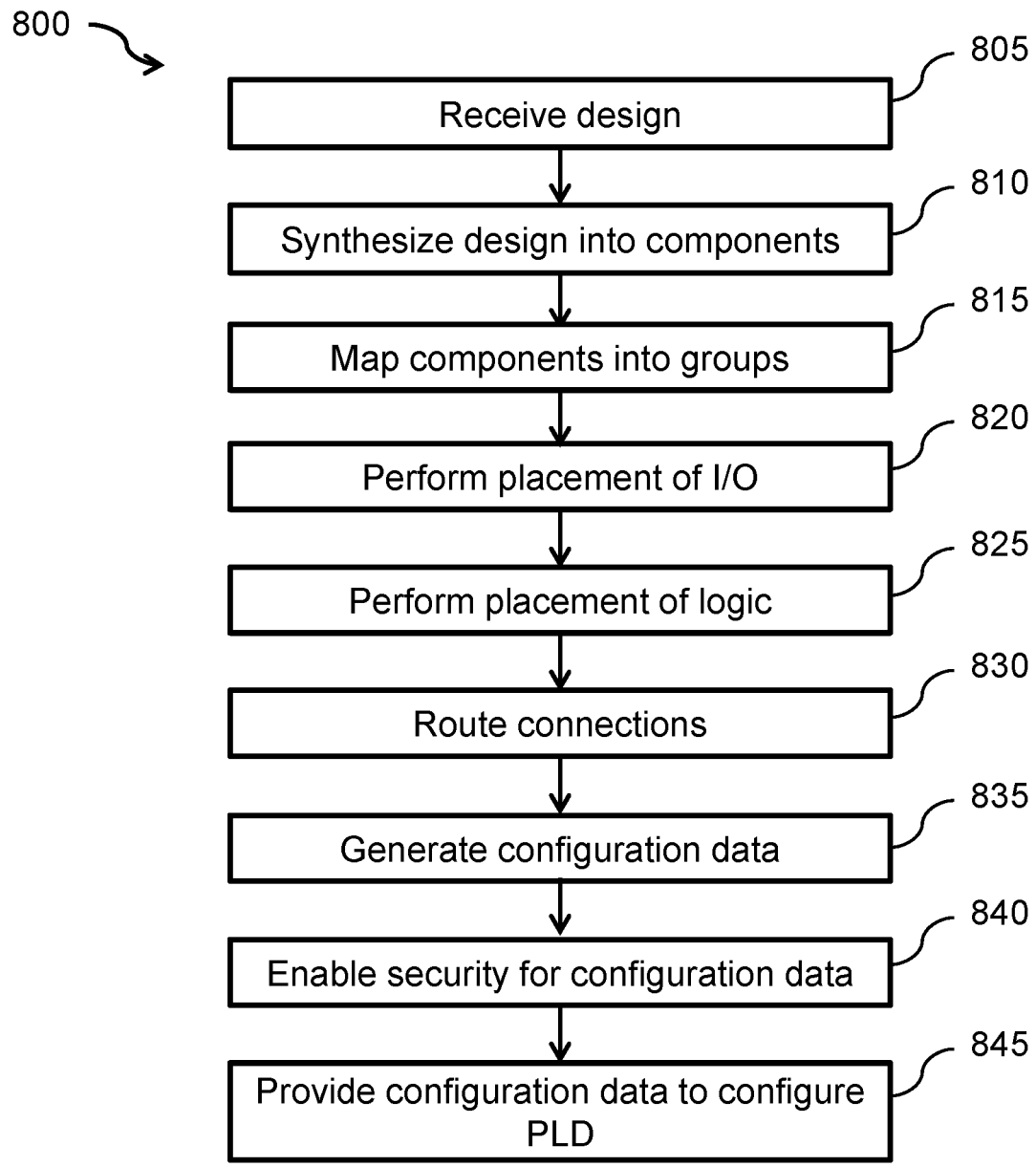
FIG. 8 illustrates a flow diagram of an example design process for a PLD in accordance with an embodiment of the disclosure.

FIG. 8 illustrates a flow diagram of an example design process 800 for a PLD in accordance with an embodiment of the disclosure. Note that one or more operations may be combined, omitted, and/or performed in a different order as desired. For example, the process of FIG. 8 may be performed by the external system 130 running Lattice Diamond software to configure the PLD.

At block 805, the external system 130 receives a design that specifies a desired functionality of a PLD (e.g., 300). For example, a user may interact with the external system 130 (e.g., through user input device 137 and hardware description language (HDL) code representing the design) to identify various features of the design (e.g., high level logic operations, hardware configurations, and/or other features. For example, the HDL representation may utilize register-transfer-level (RTL)-based design. In the user design, the user may set an attribute to designate for fast boot portions of the I/O fabric, portions of the logic fabric, and/or other components.

At block 810, the external system 130 synthesizes the design into a set of netlist components that may be used to implement the design. For example, the external system 130 may provide a netlist that identifies various types of components by the PLD and their associated signals. The external system 130 may perform one or more rule checks to confirm that the design describes a valid configuration of the PLD. For example, the external system 130 may reject invalid configurations and/or request the user to provide new design information as appropriate.

At block 815, the external system 130 performs a mapping process in which sets of the netlist components are grouped (e.g., packed) together. In some cases, the sets of the netlist components may include sets associated with I/O functionality and sets associated with logic functionality.

At block 820, the external system 130 performs a placement process to assign the grouped netlist components associated with I/O functionality to particular physical components residing at specific physical locations of the PLD. For example, with reference to FIG. 3A, the placement process may place grouped netlist components associated with fast boot I/O functionality in physical locations (e.g., banks) of the PLD 300 designated for fast boot of I/O functionality, such as the physical locations of the I/O portions 205 and 210. The placement process may place grouped netlist components not associated with fast boot I/O functionality in other physical locations, such as in the I/O portions 215 and 220.

At block 825, the external system 130 performs a placement process to assign the grouped netlist components associated with logic functionality to particular physical components residing at specific physical locations of the PLD (e.g., assigned to particular logic blocks and/or particular physical components within logic blocks). For example, the placement process may place grouped netlist components associated with fast boot logic functionality (if any) in physical locations (e.g., banks) of the PLD designated for fast boot of logic functionality.

Although the blocks 820 and 825 are provided as separate blocks in FIG. 8, the blocks 820 and 825 may be performed separately or together. For example, I/O placement may occur together with logic placement. In another example, the placement of any fast boot functionality (e.g., fast boot I/O and/or logic functionality) may be performed prior to placement of any remaining I/O and/or logic functionality.

At block 830, the external system 130 routes connections among the assigned physical components (e.g., using routing resources) to realize physical interconnections. By performing the blocks 820, 825, and 835, the external system 130 determines a layout (associated with the received design) that includes positions of PLD components to be configured and activated to provide functionality (e.g., I/O and logic functionality) and associated routing.

At block 835, the external system 130 generates configuration data for the determined layout (e.g., placed-and-routed design). For example, with reference to FIG. 3A, the configuration data may include I/O configuration data for the I/O portions 205 and 210 associated with fast boot I/O, I/O configuration data for the I/O portions 215 and 220, and logic configuration data for the logic core 225.

At block 840, the external system 130 enables security for the configuration data. In an aspect, the external system 130 may generate one or more authentication certificates to allow authentication to be performed on configuration data after being loaded into configuration memory cells. In some cases, one or more authentication certificates may be generated for fast boot functionality and another one or more authentication certificates may be generated for the remaining functionality. In cases without authentication, block 840 is not performed.

In some aspects, the security may be based on keyed-hash message authentication code (HMAC) (e.g., generally faster), elliptic curve digital signature algorithm (EDCSA) (e.g., asymmetric keys), and/or others. In some cases, a certificate creator has a private key and a device holds a public key. Each authentication certificate may be or may include a bitstream digest generated based on the configuration bitstream or portion thereof. As an example, the bitstream digest may be generated by operating a secure hash algorithm (SHA) engine, such as a SHA-256 engine, on the configuration bitstream or portion thereof. In one case, one or more authentication certificates may be generated in connection with the fast boot functionality and one or more authentication certificates may be generated in connection with the remaining functionality.

At block 845, the external system 130 provides the generated configuration data to facilitate configuration and wake up of the PLD. In an aspect, the configuration data may be provided as a configuration bitstream onto bitlines to be written in corresponding configuration memory cells (e.g., configuration SRAM cells). When configuring the PLD, the configuration data may be stored in non-volatile memory (e.g., flash memory) and then loaded from the non-volatile into voltage memory of the PLD. The non-volatile memory may be in the PLD and/or external to the PLD (e.g., external hard drive, external flash drive). An example of configuring and waking up the PLD is provided with respect to FIG. 9.

Figure 9:
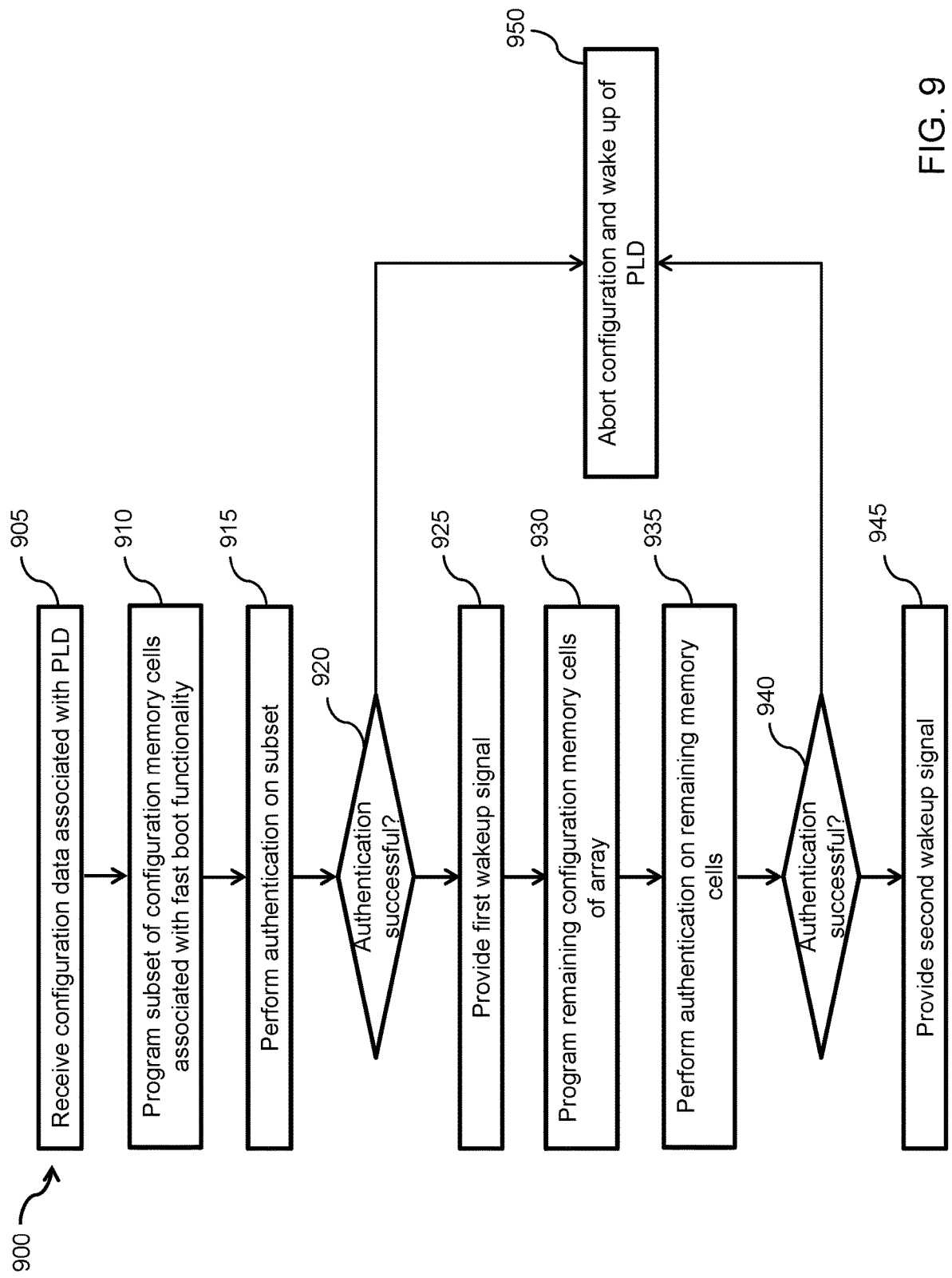
FIG. 9 illustrates a flow diagram of an example process for facilitating fast boot functionality of a PLD in accordance with an embodiment of the present disclosure.

FIG. 9 illustrates a flow diagram of an example process 900 for facilitating fast boot functionality of a PLD in accordance with an embodiment of the present disclosure. For explanatory purposes, the example process 900 is described herein with reference to the PLD 300 of FIGS. 3A-3C, although the example process 900 may be utilized with other PLDs. Note that one or more operations may be combined, omitted, and/or performed in a different order as desired.

At block 905, the processing circuit 230 receives configuration data associated with the PLD 300. The configuration data may be generated by the external system 130. In an aspect, the processing circuit 230 may obtain the configuration data from non-volatile memory of the PLD 300 (e.g., loaded into the non-volatile memory by the external system 130) that is in the PLD 300 and/or external to the PLD 300. The processing circuit 230 may receive the configuration data as part of a bitstream. In some cases, a preamble may be provided immediately before the configuration bitstream or as part of an initial sequence of bits of the configuration bitstream. The preamble may be a predetermined sequence of bits utilized as an indication of a beginning of the configuration data for the PLD 300. When security is enabled, authentication certificates may be provided along with or as part of the configuration data.

At block 910, the processing circuit 230 programs the subset of the configuration memory cells of the PLD 300 associated with fast boot functionality. The processing circuit 230 may cause the address logic circuit 235 to assert addresses associated with fast boot functionality and the data write circuit 240 to load in associated configuration data, prior to asserting addresses and loading configuration data associated with the remaining functionality (e.g., non-fast boot functionality) of the PLD 300. For example, in FIG. 3A, following the preamble, the configuration data may include configuration data frames for the I/O portions 205 and 210. As another example, in FIG. 5, following the preamble, the configuration data may include configuration data frames for the I/O portion 205, logic core portion 505, logic core portion 510, and I/O portion 210. In some cases, the order and/or shifting orientation (e.g., row-by-row or column-by-column) in which the configuration data frames are loaded into the various portions (e.g., 205, 210) may be based on speed considerations, complexity (e.g., number of data shifting and/or address shifting operations), and/or other considerations At block 915, the processing circuit 230 performs authentication of the configuration data stored in the subset of memory cells based on the corresponding authentication certificate(s). In an aspect, the authentication may be performed prior to block 915 (e.g., prior to storing the configuration data in the subset of the memory cells). For example, the authentication may be performed by running the incoming bitstream through an authentication engine, and then writing the configuration data to the subset of the memory cells. In some cases, read back and authentication (e.g., re-authentication) may be performed, although such processes may add latency. In this regard, any technique by which the configuration data that is stored or to be stored in the subset of memory cells may be determined to be intact may be utilized to authenticate the configuration data. At block 920, the processing circuit 230 determines whether authentication is successful. In cases that security is not enabled for the configuration data, blocks 915 and 920 are not performed.

If the authentication is not successful, the process 900 proceeds to block 950. At block 950, the processing circuit 230 aborts the configuration and wake up of the PLD 300. In some cases, an indication may be provided (e.g., displayed) to the user to indicate that the configuration and wake up of the PLD 300 have been aborted.

If the authentication is successful, the process 900 proceeds to block 925. The processing circuit 230 provides a wakeup signal to activate fast boot functionality. The wakeup signal may be generated by the wakeup circuit 245 of the processing circuit 230. When the fast boot functionality is activated, the PLD 300 may provide the fast boot I/O functionality, thus transitioning the associated I/O fabric of the PLD 300 from a configuration mode to a fast boot operation mode. In other PLDs, such as the PLD 500 of FIG. 5, when the fast boot functionality is activated, the PLD 500 may provide the fast boot I/O and logic functionality.

At block 930, the processing circuit 230 programs remaining configuration memory cells of the PLD 300. These remaining configuration cells are those not associated with fast boot functionality. As shown in FIGS. 3A-3C, these remaining configuration memory cells may be those in the I/O portions 215 and 220 and logic core 225.

At block 935, the processing circuit 230 performs authentication of the configuration data stored in these remaining memory cells based on the corresponding authentication certificate(s). In an aspect, the authentication may be performed prior to block 930 (e.g., prior to storing the configuration data in the remaining memory cells). More generally, in some cases, authentication procedures as described above with reference to block 915 may also apply to block 935. At block 940, the processing circuit 230 determines whether authentication is successful. In cases that security is not enabled for the configuration data, block 935 and 940 are not performed.

If the authentication is not successful, the process 900 proceeds to block 950. At block 950, the processing circuit 230 aborts the configuration and wake up of the PLD 300. If the authentication is successful, the processing circuit 230 provides a wakeup signal to activate functionality of the PLD 300. The fast boot I/O functionality may transition from the fast boot operation mode to a full system operation mode. The logic functionality and remaining I/O functionality may transition from the configuration mode to the full system operation mode.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A method comprising:
receiving configuration data associated with a programmable logic device (PLD), wherein the PLD comprises an array of configuration memory cells comprising a plurality of logic block memory cells associated with a logic fabric of the PLD and a plurality of input/output (I/O) block memory cells associated with an I/O fabric of the PLD;
programming a subset of the I/O block memory cells with a first portion of the configuration data;
providing a first wakeup signal to wake up functionality associated with a portion of the I/O fabric associated with the subset of the I/O block memory cells;
in response to the first wakeup signal, providing, by the portion of the I/O fabric, a first functionality;
programming remaining configuration memory cells of the array with a second portion of the configuration data, wherein the remaining configuration memory cells comprise at least a subset of the logic block memory cells;
providing a second wakeup signal to wake up functionality associated with at least a portion of the logic fabric associated with the subset of the logic block memory cells; and
in response to the second wakeup signal, transitioning the portion of the I/O fabric and the portion of the logic fabric into a system operation mode, wherein:
within a predetermined amount of time after the transitioning into the system operation mode, maintaining, by the portion of the I/O fabric, the first functionality; and
after the predetermined amount of time, providing, by the portion of the I/O fabric, a second functionality.

2. The method of claim 1, further comprising operating the portion of the I/O fabric while the programming the remaining configuration memory cells is performed.

3. The method of claim 1, wherein the subset of the logic block memory cells is a first subset of the logic block memory cells, wherein the portion of the logic fabric is a first portion of the logic fabric, the method further comprising:
programming a second subset of the logic block memory cells with a third portion of the configuration data, wherein the providing the first wakeup signal comprises providing the first wakeup signal to wake up functionality associated with a second portion of the logic fabric.

4. The method of claim 3, further comprising:
in response to the first wakeup signal, transitioning the second portion of the logic fabric to a fast boot operation mode associated with a third functionality for the second portion of the logic fabric; and
in response to the second wakeup signal, transitioning the second portion of the logic fabric from the fast boot operation mode to the system operation mode associated with a fourth functionality for the second portion of the logic fabric.

5. The method of claim 3, wherein the functionality associated with the portion of the I/O fabric is based on the functionality associated with the second portion of the logic fabric.

6. The method of claim 5, wherein:
the array of configuration memory cells is arranged in rows and columns,
the subset of the I/O block memory cells comprises one or more sets of contiguous columns of the I/O block memory cells, and
the second subset of the logic block memory cells comprises one or more sets of contiguous columns of the logic block memory cells that are contiguous with the one or more sets of contiguous columns of the I/O block memory cells.

7. The method of claim 1, wherein the configuration data comprises first authentication information associated with the subset of the I/O block memory cells, the method further comprising:
performing a first authentication associated with the first portion of the configuration data based on the first authentication information,
wherein the providing the first wakeup signal, programming the remaining configuration memory cells, and providing the second wakeup signal are performed when the first authentication of the subset of the I/O block memory cells is successful.

8. The method of claim 7, wherein the performing the first authentication is performed after the programming the subset, wherein the configuration data comprises second authentication information associated with the remaining configuration memory cells, the method further comprising:
performing a second authentication associated with the second portion of the configuration data based on the second authentication information,
wherein the providing the second wakeup signal is performed when the second authentication of the remaining configuration memory cells is successful.

9. The method of claim 1, wherein, after the programming the subset, each of the subset of the I/O block memory cells is associated with driving a 0, driving a 1, or being in tri-state.

10. The method of claim 1, wherein the subset of the I/O block memory cells comprises a first set of the I/O block memory cells and a second set of the I/O block memory cells, wherein the programming the subset of the I/O block memory cells comprises:
configuring an address shifter and a data shifter to program column-by-column;
programming the first set of the I/O block memory cells column-by-column using the address shifter and data shifter;
transitioning the address shifter and data shifter to program row-by-row; and
after the transitioning, programming the second set of the I/O block memory cells row-by-row using the address shifter and data shifter.

11. A non-transitory machine-readable storage medium including instructions which, when executed, cause one or more processors of a device to perform operations comprising:
receiving a design identifying operations to be performed by the PLD, wherein at least one of the operations is associated with fast boot;

synthesizing the design into a first plurality of PLD components associated with the fast boot and a second plurality of PLD components;

determining a layout comprising positions for the first plurality of PLD components for facilitating the fast boot and positions for the second plurality of PLD components;

generating the configuration data based on the determined layout; and providing the configuration data to configure the PLD to perform the method of claim 1.

12. The non-transitory machine-readable storage medium of claim 11, wherein the operations further comprise:

generating authentication information associated with the first plurality of PLD components, wherein the providing the configuration data comprises providing the configuration data and the authentication information, wherein the configuration data associated with the fast boot is provided to configure the PLD prior to the remaining configuration data being provided.

13. The non-transitory machine-readable storage medium of claim 11, wherein the first plurality of PLD components comprises first configuration memory cells and the second plurality of PLD components comprises second configuration memory cells, wherein the operations further comprise:

programming the first configuration memory cells using the first portion of the configuration data;

providing the first wakeup signal to activate functionality associated with the first plurality of PLD components;

programming the second configuration memory cells using the second portion of the configuration data; and providing the second wakeup signal to activate functionality associated with the second plurality of PLD components.

14. A system, comprising:
the non-transitory machine-readable storage medium of claim 13; and
the one or more processors.

15. A system, comprising:
the non-transitory machine-readable storage medium of claim 11; and
the one or more processors.

16. A programmable logic device (PLD) comprising:
an array of configuration memory cells comprising a plurality of logic block memory cells associated with a logic fabric of the PLD and a plurality of input/output (I/O) block memory cells associated with an I/O fabric of the PLD;
a processing circuit configured to:
receive configuration data associated with the PLD;
program a subset of the I/O block memory cells with a first portion of the configuration data;
provide a first wakeup signal to wake up functionality associated with a portion of the I/O fabric associated with the subset of the I/O block memory cells;
in response to the first wakeup signal, provide, by the portion of the I/O fabric, a first functionality;

program remaining configuration memory cells of the array with a second portion of the configuration data, wherein the remaining configuration memory cells comprise at least a subset of the logic block memory cells;
provide a second wakeup signal to wake up functionality associated with at least a portion of the logic fabric associated with the subset of the logic block memory cells; and
in response to the second wakeup signal, transition the portion of the I/O fabric and the portion of the logic fabric into a system operation mode, wherein:
within a predetermined amount of time after transitioning into the system operation mode, maintain, by the portion of the I/O fabric, the first functionality; and
after the predetermined amount of time, provide, by the portion of the I/O fabric a second functionality.

17. The PLD of claim 16, wherein the array is arranged in rows and columns, and wherein the plurality of I/O block memory cells is positioned around the plurality of logic block memory cells.

18. The PLD of claim 16, wherein:
the processing circuit comprises:
an address logic circuit configured to selectively assert rows or columns of the array;
a data write circuit configured to provide the configuration data to the array; and
a wakeup circuit configured to generate the first and second wakeup signals; and
the processing circuit is configured to program the array using the address logic circuit and the data write circuit.

19. The PLD of claim 16, wherein:
the configuration data comprises authentication information associated with the subset of the I/O block memory cells,
the processing circuit is further configured to perform an authentication of the subset of the I/O block memory cells based on the authentication information, and
the processing circuit is configured to provide the first wakeup signal, program the remaining configuration memory cells, and provide the second wakeup signal when the authentication of the subset is successful.

20. The PLD of claim 19, wherein:
the configuration data comprises second authentication information associated with the remaining configuration memory cells,
the processing circuit is configured to:
perform the authentication after programming the subset;
perform a second authentication associated with the second portion of the configuration data based on the second authentication information; and
provide the second wakeup signal when the second authentication of the remaining configuration memory cells is successful.

* * * * *